(12) United States Patent
Pouchon

(10) Patent No.: US 11,742,096 B2
(45) Date of Patent: Aug. 29, 2023

(54) AQUEOUS ADDITIVE PRODUCTION METHOD FOR THE FABRICATION OF METALLIC BODIES

(71) Applicant: PAUL SCHERRER INSTITUT, Villigen Psi (CH)

(72) Inventor: Manuel Alexandre Pouchon, Nussbaumen (CH)

(73) Assignee: Paul Scherrer Institut, Villigen Psi (CH)

( * ) Notice: Subject to any disclaimer, the term of this patent is extended or adjusted under 35 U.S.C. 154(b) by 1022 days.

(21) Appl. No.: 16/327,005

(22) PCT Filed: Aug. 8, 2017

(86) PCT No.: PCT/EP2017/070098
§ 371 (c)(1),
(2) Date: Feb. 21, 2019

(87) PCT Pub. No.: WO2018/036813
PCT Pub. Date: Mar. 1, 2018

(65) Prior Publication Data
US 2019/0193152 A1 Jun. 27, 2019

(30) Foreign Application Priority Data

Aug. 23, 2016 (EP) .................................. 16185359

(51) Int. Cl.
*G21C 3/58* (2006.01)
*G21C 3/60* (2006.01)
(Continued)

(52) U.S. Cl.
CPC .............. *G21C 3/58* (2013.01); *B22F 3/105* (2013.01); *B22F 10/10* (2021.01); *B28B 1/001* (2013.01);
(Continued)

(58) Field of Classification Search
CPC .. G21C 21/02; G21C 3/58–64; B29C 64/333; B29C 64/209; B29C 64/255;
(Continued)

(56) References Cited

U.S. PATENT DOCUMENTS 4,364,859 A * 12/1982 Ohtsuka ................... H05B 6/80
  204/157.43
4,431,164 A *  2/1984 Jungo ..................... H05B 6/802
  252/635
(Continued)

FOREIGN PATENT DOCUMENTS

CN   102971070 A   3/2013
CN   103804993 A   5/2014
(Continued)

OTHER PUBLICATIONS

Streit, Marco et al. "(Pu,Zr)N Annular Fuel Pellets Shaped By Direct Coagulation Casting", Journal of Nuclear Science and Technology, vol. 39, No. SUP3, pp. 741-744, XP002767246, III. Experilental results and discussion, ISSN: 0022-3131 (Print), 1881-1248 (Online); 2002.

*Primary Examiner* — Joseph S Del Sole
*Assistant Examiner* — Margaret B Hayes
(74) *Attorney, Agent, or Firm* — Laurence A. Greenberg; Werner H. Stemer; Ralph E. Locher

(57) ABSTRACT

A green body for a 3D ceramic and/or metallic body is produced by providing a metal or a mixture of metals and/or a metalloid and/or a non-metal or mixtures thereof in form of at least one aqueous solutions, such as a metal nitrate solution; if more than one aqueous solutions are provided, they differ in composition and/or isotope concentration. One aqueous metal solution is mixed with a gelation fluid at a first temperature to suppress an internal gelation of the feed solution mixture prior to its ejection. The feed solution mixture is ejected by inkjet printing to the green body under (Continued)

construction. The ejected feed solution is heated mixture on the green body to a second temperature to fix it on the green body under construction. Several process steps are repeated according to a 3D production control model until a desired form of the green body is attained.

11 Claims, 2 Drawing Sheets

(51) Int. Cl.
    *B33Y 10/00*     (2015.01)
    *B28B 1/00*     (2006.01)
    *G21C 3/62*     (2006.01)
    *C04B 38/06*     (2006.01)
    *C04B 35/624*     (2006.01)
    *C04B 35/01*     (2006.01)
    *C04B 35/571*     (2006.01)
    *B22F 10/10*     (2021.01)
    *B33Y 70/10*     (2020.01)
    *B22F 3/105*     (2006.01)
    *B28B 11/24*     (2006.01)
    *C04B 111/00*     (2006.01)
    *B22F 12/00*     (2021.01)
    *B22F 12/37*     (2021.01)
    *B22F 12/53*     (2021.01)
    *B22F 12/55*     (2021.01)
    *B33Y 80/00*     (2015.01)

(52) U.S. Cl.
    CPC ............ *B28B 11/243* (2013.01); *B33Y 10/00* (2014.12); *B33Y 70/10* (2020.01); *C04B 35/01* (2013.01); *C04B 35/571* (2013.01); *C04B 35/624* (2013.01); *C04B 38/06* (2013.01); *G21C 3/60* (2013.01); *G21C 3/62* (2013.01); *B22F 12/22* (2021.01); *B22F 12/37* (2021.01); *B22F 12/53* (2021.01); *B22F 12/55* (2021.01); *B22F 2003/1054* (2013.01); *B33Y 80/00* (2014.12); *C04B 2111/00181* (2013.01); *C04B 2235/6026* (2013.01); *C04B 2235/665* (2013.01); *C04B 2235/667* (2013.01); *Y02E 30/30* (2013.01)

(58) Field of Classification Search
    CPC ... B29C 64/106; B29C 64/112; B29C 64/118; B29C 64/165
    See application file for complete search history.

(56) References Cited

U.S. PATENT DOCUMENTS

| | | | |
|---|---|---|---|
| 4,436,677 A | * | 3/1984 | Radford ................. G21C 3/623 252/643 |
| 6,454,972 B1 | * | 9/2002 | Morisette ................. C04B 35/63 264/236 |
| 9,006,720 B2 | | 4/2015 | Chiruvolu et al. |
| 2014/0203460 A1 | | 7/2014 | Lahoda et al. |
| 2017/0246803 A1 | * | 8/2017 | Johnson ................. B29C 64/20 |

FOREIGN PATENT DOCUMENTS

| | | | | |
|---|---|---|---|---|
| WO | | 2015200257 A1 | 12/2015 | |
| WO | | WO-2016019435 A1 | * 2/2016 | ........... B29C 64/106 |

* cited by examiner

AQUEOUS ADDITIVE PRODUCTION METHOD FOR THE FABRICATION OF METALLIC BODIES

BACKGROUND OF THE INVENTION

Field of the Invention

The present invention relates to a method for producing a green body (9a to 9c) for a 3D ceramic and/or metallic body.

The fabrication of 3D objects in terms of ceramic or metallic bodies can be a manifold task due to the complexity of the design, the difficulties to handle the ingredients, such as radioactive components, and a lot other parameters that might have an impact on the fabrication.

I.e., Paul Scherrer Institut (PSI), CH-5232 Villigen PSI, has a long tradition in developing advanced nuclear fuels. Some major efforts went into the development of actinide and minor actinide containing fuels for transmutation. One route has been the development of inert matrix fuels, for plutonium transmutation in light water reactors, either as yttria stabilized zirconia pellets [1], or as CerMet pellets [2]. It is almost superfluous to mention that these materials encumber one of the highest complexities in a manufacturing environment due to the high radioactivity of the actinide metals used in nuclear fuels, especially when they contain minor actinides for transmutation purpose.

The other route was the development of alternative, aqueous production methods, in order to simplify the fabrication, making it ready for remote manipulation. The major effort went into the internal gelation, resulting in sphere-pac fuel. Both, the gelation and fuel performance of this particular concept are summarized in [3] and [4]. As the pellet fuel is a well experienced concept in commercial light water reactors, and also in many advanced systems, such as sodium cooled fast reactors, some efforts went also in the direction of developing aqueous fabrication routes, resulting in pellets. Early approaches concentrated on crushing spheres into pellet-shape and heat treat them (see [5] and [6]), resulting in so called hybrid pellets. But also the use of an aqueous direct ceramic shaping methods was already introduced at PSI [7], using the direct coagulation casting technique. Another effort went in the direction of freeze drying [8].

The closure of the nuclear fuel cycle offers very promising aspects like an improved uranium resource usage and a major reduction of long lived minor actinides in the final waste. For a comparison of different aspects between the classical once through PWR scenario, the once reuse of Pu option and the fully closed fuel cycle involving fast reactors see FIG. 3 in [9].

Closing the cycle of course involves reprocessing of spent fuel, and the fabrication of highly active, minor actinide containing fuel. The high activity imposes new production challenges compared to the production of fresh nuclear fuel. Most important:

a) the production must be performed remotely in a shielded environment (hot-cell), and b) any accumulation of fuel educts should be avoided (because of high equipment contamination and criticality risk).

The first aspects calls for production equipment with less maintenance need. The latter aspect disfavors powder based production, as dust is volatile and can deposit anywhere in the production environment, the hot-cell.

The solution to these challenges can be a simplified pellet process [10] or particle fuel with much simplified production passes. At PSI, the particle fuel option was researched over decades using the aqueous internal gelation process resulting in fuel pebbles used in the sphere-pac concept. An extensive description of sphere-pac and also the vipac fuel can be found in [3].

Pellet fuel has heavily been optimized for $UO_2$ in Zircaloy cladding and LWR reactors. If considering fast reactors, other fuel matrices, such as carbides and nitrides might become more attractive [11] because of higher metal content and better thermal conductivity. However, the swelling behavior especially of carbides is much higher compared to oxides. Therefore, porosity should be designed to accommodate the dimensional change with burnup.

The ATF (accident tolerant fuel) initiative is a large, post-Fukushima effort, to reduce the risk of fuel/cladding failure in case of an accident [12]. Some of the concepts are based on oxidation and high temperature resistant ceramics. These are by nature brittle, even though pseudo ductility is introduced by using a composite. However, fuel-cladding mechanical interaction should be avoided by designing a large gap. In order to avoid an important temperature step, one concept being suggested is the introduction of porous graphite buffer.

PSI has already implemented a base process for the production of fuel pellets. The internal gelation technique [13] is well experienced at PSI. As illustrated above, it has been used for decades to produce pebbles for the sphere-pac concept. The main feature of the internal gelation is the heat triggered solidification process. This means that the gel can be formed by heating the feed solution, which was classically performed by hot silicon oil surrounding the droplets of feed solution. In the Swiss CCEM.CH project PINE and MeAWaT [13], [14] and the he European projects ASGARD and PELGRIMM [16], [17], the internal gelation was researched by using microwaves for heating in order to avoid any radiolysis and decay heating influence onto the process and to be able to work with non-cooled solutions [15].

It is therefore the objective of the present invention to provide a method, in particular in nuclear fuel production, providing an almost dustless fabrication method with the ability to introduce locally varying features like the metal component composition, the enrichment (which is the isotope composition) and the porosity.

SUMMARY OF THE INVENTION

This objective is achieved according to the present invention by a method for producing a green body (9a to 9c) for an 3D ceramic and/or metallic body, comprising the steps of:

a) creating a 3D production control model for the green body (9a to 9c);

b) providing a metal or a mixture of metals and/or a metalloid and/or a non-metal or mixtures thereof in form of at least one aqueous solutions (1a, 1b, . . . , 1n), such as a metal nitrate solution; in case of at least two aqueous solutions (1a, 1b, . . . , 1n); said at least two aqueous solutions differ from each other in terms of composition and/or isotope concentration;

c) providing a gelation agent in form of a gelation fluid (2);

d) mixing one of the at least one aqueous metal solutions (1a, 1b, . . . , 1n) with the gelation fluid (2) at a first temperature to form an feed solution mixture wherein the first temperature is chosen to suppress an internal gelation of the feed solution mixture prior to its ejection;

e) ejecting the feed solution mixture by an inkjet printing process to the green body under construction;

f) heating the ejected feed solution mixture on the green body under construction to a second temperature wherein the second temperature is chosen to fix the ejected feed solution mixture on the green body under construction; and g) repeating the steps e) and f) and optionally d) according to the 3D production control model until a desired form of the green body (9a to 9c) will have been achieved; and h) optionally heating the green body to a third temperature under given atmosphere, such as an oxidizing or reducing atmosphere, to achieve the formation of the 3D ceramic or metallic body and/or to partially or fully sinter the green body. In this step also the chemical residuals from the gelation reaction can be driven out of the product.

Therefore, the present invention improves the internal gelation process combined with an implementation of the 3D inkjet printing technique for ceramics or metals in order to enable the fabrication of various complex 3D ceramic or metal bodies, such as nuclear fuel pellets and the like. With 3D printing and the possibility to supply different aqueous metal solutions to the mixing step, this is achieved locally; allowing maximal flexibility in 3D design. As Pu and minor actinides are to be introduced in fast reactor fuel for transmutation, the same applies for the local metal composition, which could be optimized with this technique.

It is in many cases very useful if the composition of the green body can be varied as a function of the green body location. According to a preferred embodiment of the present invention, this objective can be achieved when during the repetition of the steps e) and f) the composition of the mixture varies in terms of composition and/or isotope concentration. It is therefore possible to provide for each new layer of the ejected mixture (or for part of a layer) a different composition since the composition can be easily controlled by the choice of the aqueous metal solution fed actually to the mixing step.

A similar approach can be realized with respect to a desired porosity profile of the green body. Hence, a pore builder can be fed in form of a pore forming additive into the mixing step d).

In order to facilitate a simple handling of the feed solution mixture and to avoid aging/decay problems and/or clogging of the inkjet printing process due to beginning gelation, it can be advantageous when the mixing step d) is performed immediately prior to the ejection of the ink mixture, preferably in proximity to an ink nozzle. Therefore, the time interval between mixing and ejecting the feed solution mixture is extremely short and can range from some milliseconds to some seconds, such as 200 ms or 5 s or the like.

In order to offer superior conditions for the gelating of the mixture on the mixture target (the green body under construction), a further preferred embodiment of the present invention may provide that the heating of the ejected mixture on the green body under construction is achieved by heating the green body under construction by any combination of laser, microwave and other heating technique and/or heating of the ejected ink mixture during and/or after depositing the ejected feed solution mixture on the green body under construction by a mentioned heating technique or any combination of it.

In order to construct 3D ceramic or metal bodies having complex form including for example cavities, it is desirable to have a high flexibility during the deposition of the feed solution mixture. This objective can be achieved when the sample holder can be moved horizontally and vertically and can be rotated around the vertical axis and can be tilted with respect to the vertical axis.

Preferred implementations of the inventive method described above are listed in the claims.

The present invention and preferred embodiments thereof are hereinafter described in more detail with reference to the attached drawings which depict in:

DESCRIPTION OF THE INVENTION

Figure 1:
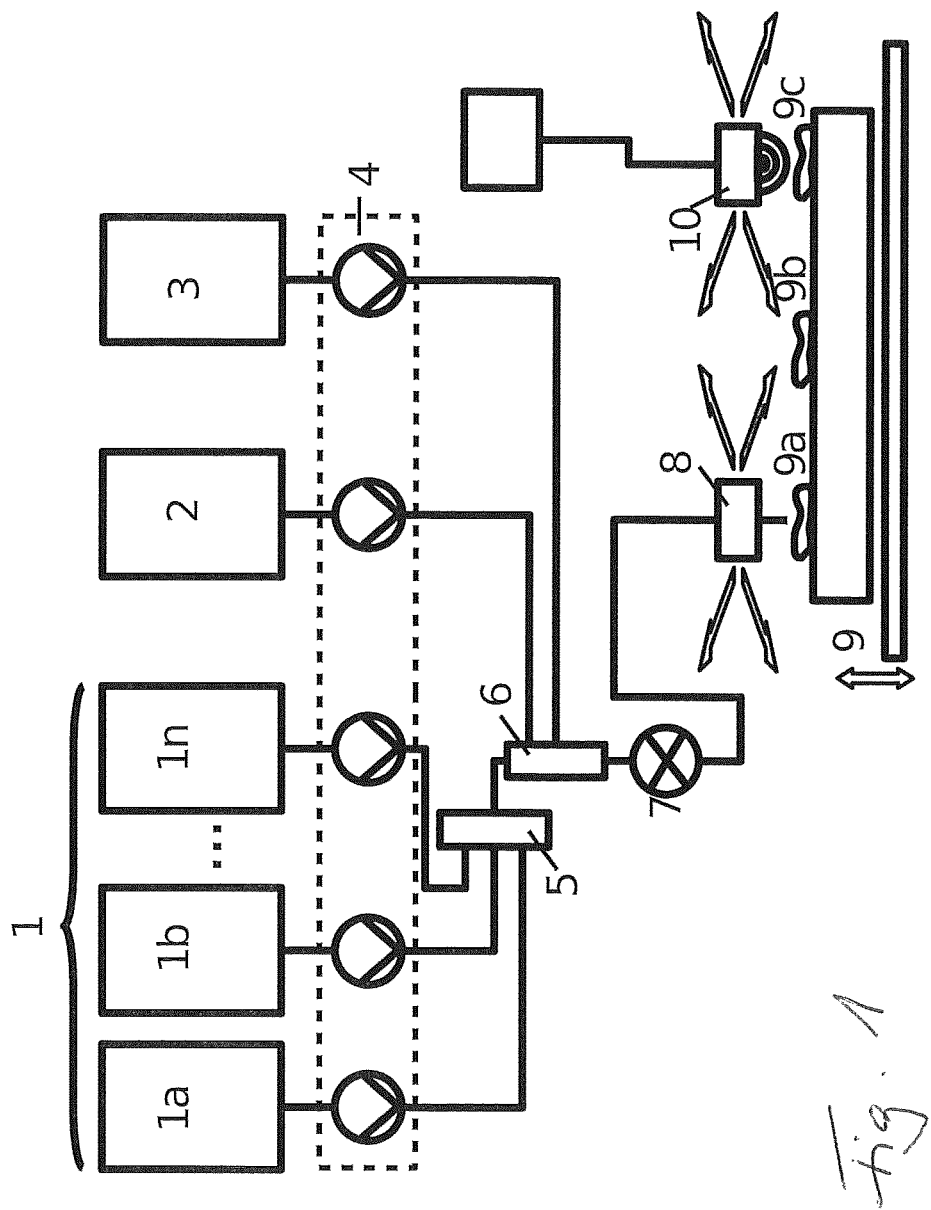
FIG. 1 schematically a setup for the production of nuclear fuel pellets.

Implementation Example 1—Realization of a Nuclear Fuel Pellet with Variable Composition and Porous Surface Layer Hereinafter, an implementation example for the production of nuclear fuel pellets with a variable composition and a porous surface layer is explained in more detail. The example describes the production of an advanced nuclear fuel pellet, which varies in its composition and features a soft surface. The aim is to have a well conducting outer pellet region, made out of pure uranium-oxide, and to enrich the inner section in minor actinides, for their transmutation. The porous, soft surface is aiming for a reduction in the pellet-cladding mechanical interaction.

Two metal feed solutions 1a and 1b are prepared, one uranium nitrate solution (deficient uranyl-nitrate solution (ADUN)) and another nitrate solution containing americium, curium and neptunium. As a variation of that, a further solution can contain plutonium, and/or one or several of the before mentioned minor actinides can be prepared in separate solutions. In the Figure, these metal solutions are represented in a container section 1.

A gelling agent 2 is prepared which is the organic compound hexamethylenetetramine, also called HMTA (Hexamine), which is acting as a homogeneous precipitating agent. HMTA causes rapid precipitation of U(VI). Therefore, in order to prevent a premature gelation the organic compound urea $(CO(NH2)2)$ is added to complex the uranyl ions [13].

In a first step, the metal solutions are mixed in a first mixing unit 5, which can be also realized as simple T junction, if only 2 metal solutions are mixed, or, if the number of metal solutions n is higher, in a specially developed blender, with n entries. In the next step, the blended metal nitrate solution is mixed in a second mixing unit 6 to the gelation agent 2. From this time the gelation reaction is starting, especially if the temperature is kept at ambient conditions, or is even elevated, due to the decay heating of the minor actinides (up to 50° C.). This latter step of in-situ mixing of the metal solution 1a, 1b to the gelation agent 2 has been lately developed in the MeAWaT project at PSI [15]. In the same blending step (in the second mixing unit 6) a pore builder 3, such as graphite, is added which acts as a pore former in the thermal treatment process. As an alternative other additives can be injected here, to achieve modifications to the material. A small mixing/homogenization device 7 is inserted by having short range windings in the tube. Depending on the design and tube lengths, this step can be optionally omitted. The metal solutions 1a, 1b, the gelation agent 2 and the pore builder 3 are conveyed by corresponding pumps 4.

The ratio of the metal ions (here uranium and minor actinides) can be changed at any time, by adjusting the feeding rate of the corresponding pumps 4. These pumps 4 are realized as high precision HPLC pumps here. The inner diameter of all tubes is chosen to be 0.18 mm. The resolution of composition variations in the final product is given by a ratio between the time resolution of the pumps 4 with the feeding rate and the effective blending volume in the first mixing unit 5. With a simple T junction this is typically the volume with a sphere of the inner tube diameter. All the volume in the tubes after the blending step to the deposition on a sample 9a being supported by a sample holder 9 which is controlled to move vertically according to the progress of the 3D printing process will lead to a delay, which has to be accounted for when programming the feeding rates for the metal solutions. In this application, the typical time after mixing to the gelation agent 2 (in the second mixing unit 6) to the deposition on the sample 9a is in the sub-second range. This means that practically all the gelation reaction will happen after deposition. With these short times, cooling of the feed solutions is not necessary, as only at temperatures approaching 60-100° C. the reaction (gelation) time drops into the sub-second range.

As in other 3D printing applications, an ink-jet nozzle 8 is used to deposit the feed solution to the surface of the sample 9a (the feed solution target). A special version of such a nozzle has been developed, as radiation can degrade piezo crystals. This new nozzle 8 is based on electromagnetic forces.

The nozzle 8 is mounted on a laterally moving stage. The samples 9a, 9b and 9c are placed on a vertically moving sample holder 9, providing together with the nozzle 8 the three-dimensional accessibility. In the application here, where the final product will be a pellet of typically 10 mm diameter and 10 mm height, an array of 10×10 such samples 9a to 9x are produced at the same time. For each sample new layers of feed solution are applied in rings from outside to the center. As the compositions and porosity variations in the pellet are realized in a radial manner, this requires the least variation in the pump-feeding rates. After applying a layer to one sample 9a, the stage moves on to the next one. The newly applied layer is then fixed with a coaxial microwave applicator 10, heating up here actually the surface of the sample 9c. Alternatively other forms of energy applicators can be used. This way the gelation is finalized, and the chemical residuals are driven out the sample 9a. After applying several layers in this way, a high temperature treatment is realized, in order to have calcination and partial sintering. Alternatively, a second heating source is realized with a laser (parallel to the coaxial microwave applicator 10 or replacing it), which can provide locally very high temperatures and therefore sintering.

In the oxidizing atmosphere, the aimed oxide ceramics will be realized this way. The applied graphite will also oxidize to CO2 and leave the wished porosity in the samples 9a, 9b, 9c. By an appropriate supply of the pore builder 3, a gradient in the porosity can be achieved over the sample in at least one dimension.

Implementation Example 2—Realization of a Nuclear Fuel Pellet Containing Sealed Fuel Cells In this example, a fuel pellet is printed containing honeycomb structured SiC boundaries filled with nuclear fuel, such as UC and a porous layer, facing the boundaries. UC is an attractive fuel matrix, as it features a very good thermal conductivity and a higher content in metal, compared to $UO_2$. Unfortunately, it also features two disadvantages, which are the chemical reactivity in oxidizing surroundings and the higher swelling rate compared to standard fuel.

With the approach presented here, the chemical reactivity is mitigated, by splitting up the fuel in many small cells. Even if a cell boundary fails, the reactive volume is very limited, not affecting the overall integrity of the pellet. With the subdivision into the multiple small cells, also containing the porous outer layer in each cell, the swelling will be accommodated on the cell level, and not on the pellet scale. The pellet therefore remains constant in volume (except for some SiC swelling, which is limited by about 1%) and does therefore not interfere with the cladding.

The SiC is very oxidation resistant, and shows excellent high temperature resistance. Therefore, this fuel type could qualify as accident tolerant fuel (ATF), which is an effort to mitigate the effects of accident scenarios like in Fukushima. The approach has some similarity with the suggestion of including TRISO particles in a SiC pellet. This might even show better accident tolerance, as there are more structural layers being involved. However, with the resulting low fuel fraction in the pellet, would require a higher enrichment.

The setup chosen to produce these pellets is very similar to the setup shown in FIG. 1. The second solution 1b in the first example will comprise silicon. There will be no variable mixing at first mixing unit 5, but a digital one. Either the nuclear fuel component 1a or the silicon solutions 1b, such as methyltrichlorosilane, will be applied. When it comes to the deposition to the sample, first the boundaries, finally resulting in SiC, will be printed, and then the porous layer near the boundaries, and finally the fuel will be printed in the cells. The thermal treatment will be performed under reducing atmosphere, resulting in a carbo-thermal reaction. For this reaction graphite will be added in the second mixing unit 6 to the fuel printing solutions. The first gelation reaction will be effected here. In case of the SiC layer, the methyltrichlorosilane will directly be treated thermally which in the reducing atmosphere will result in the SiC ceramic. In case of the porous layer, no graphite will be added, but polystyrene will be applied, by crosslinking of polystyrene chains and carbonization a porous carbon layer will form. As the mixing volumes are very small, all of these solution applications can be performed with the same system/nozzle. Alternatively, several nozzles can be used, to increase the production speed, and simplify the single applicators.

Implementation Example 3—Complex Nuclear Fuel Structures for Very Advanced Concepts An example of very advanced nuclear concepts is the fission fragment reactor. Here the kinetic energy of the electrically charged fission fragments is directly transferred into electrical energy. One of the major tasks here is the design and production of the nuclear fuel part, and some surrounding system which deaccelerates the fission products, either through electric and magnetic fields, or through conductors with different electron densities.

For the production of such an advanced nuclear component, some cavities might have to be maintained. Here an advanced sample holder 12 shown in FIG. 2 will be applied, allowing the production of any arbitrary shape, including empty volumes. The applied feed solution is then always applied to surfaces with a normal vector in gravity direction. The fixation is then within very short time, as either the existing sample surface temperature is elevated and/or heating is applied though a method already described for the first implementation example (microwave applicator 10, laser or others).

With the method described in FIG. 1, rather flat samples can be produce, with only limited possibility to build macroscopic inner cavities. The reason is the application of the feed solution to the sample surface, which is in a rather inviscid state, as the gelation only starts on the surface. The surface tension of the droplets and the fast gelation dynamics are the only effects which can help to produce craning structures. In most of cases a macroscopically dense structure with some designed porosity and without overhanging structures will be sufficient.

Figure 2:
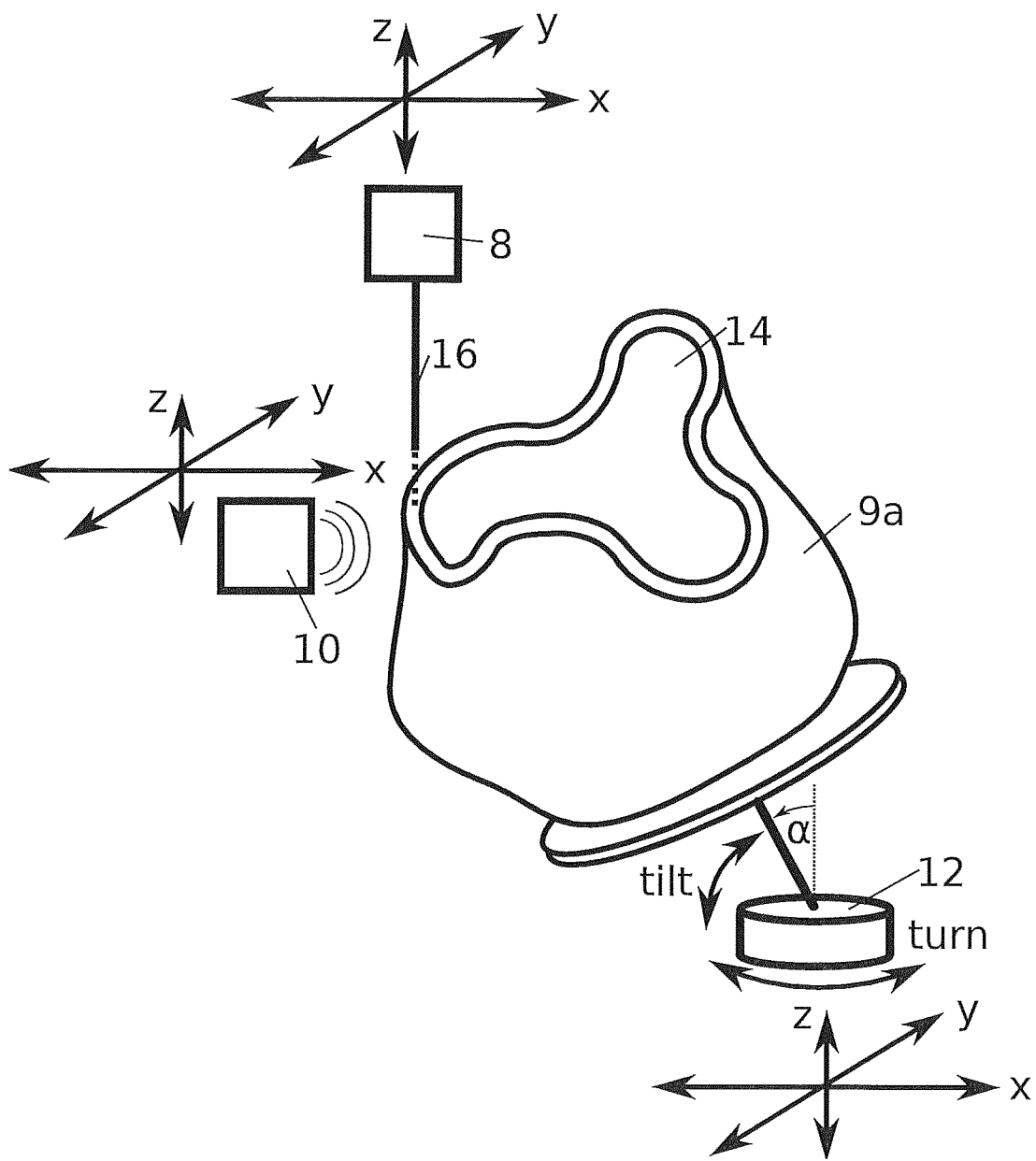
FIG. 2 schematically a sample holder with some degree of freedom for the movement of the sample holder.

For some special cases, in FIG. 2 a 5-axis sample holder 12 is suggested, which will provide a solution application surface normal, always being parallel to gravity. In detail, the sample holder 12 can be moved in the horizontal plane and can be displaced vertically, too. Further, the sample holder 12 can be rotated around the vertical axis and can be tilted by an angle α with respect to the vertical axis. These movements in total provide a freedom to move in 5 axis. As the gelation will take place very quickly, the sample 9a can continuously be moved to other surfaces, adjusting the angles again. With this method, also horizontal structures can directly be constructed. FIG. 2 exemplarily shows the sample 9a having a larger inner cavity 14 which can be easily constructed by the concerted movement of the sample holder 12, the feed solution ejection by the nozzle 8 with its needle 16 and the microwave applicator 10 which allows the immediate gelation of the most recently applied product layer.

As also present for the first and second example, the third example requires a bit more complex 3D production control model for the generation of the green body/sample 9a. This model in detail comprises the detailed data about the ingredients of the ink mixture, the printing control data for the nozzle 8 and the heating data to control the microwave applicator 10.

BIBLIOGRAPHY

[1] G. Ledergerber, C. Degueldre, P. Heimgartner, M. A. Pouchon, and U. Kasemeyer, "Inert matrix fuel for the utilisation of plutonium," *Prog. Nucl. Energy*, vol. 38, no. 3-4, pp. 301-308, 2001.

[2] K. Idemitsu, "Incineration of Excess Plutonium in a CerMet Fuel," PSI, Paul Scherrer Institut, Villigen, Switzerland, TM-43-97-29, September 1997.

[3] M. A. Pouchon, G. Ledergerber, F. Ingold, and K. Bakker, "3.11—Sphere-Pac and VIPAC Fuel A2—Konings, Rudy J. M.," in *Comprehensive Nuclear Materials*, Oxford: Elsevier, 2012, pp. 275-312.

[4] M. Å. Pouchon, L.-A. Nordström, and C. Hellwig, "3.25—Modeling of Sphere-Pac Fuel A2—Konings, Rudy J. M.," in *Comprehensive Nuclear Materials*, Oxford: Elsevier, 2012, pp. 789-817.

[5] G. Ledergerber, "Kugeln als Ausgangsmaterial für Pellets," PSI, Paul Scherrer Institut, Villigen, Switzerland, TM-43-89-21, August 1989.

[6] G. Ledergerber, F. Ingold, R. W. Stratton, H.-P. Alder, C. Prunier, D. Warin, and M. Bauer, "Preparation of Transuranium Fuel and Target Materials for the Transmutation of Actinides by Gel Coconversion," *Nucl. Technol.*, vol. 114, no. 2, pp. 194-204, May 1996.

[7] M. Streit, F. Ingold, L. J. Gauckler, and J.-P. Ottaviani, "(Pu, Zr)N Annular Fuel Peiets Shaped By. Direct Coagulation Casting," *J. Nucl. Sci. Technol.*, vol. 39, no. sup3, pp. 741-744, November 2002.

[8] E. Hart, "Ceramic pellet fabrication by freeze-drying," PSI, Paul Scherrer Institut, Villigen, Switzerland, TM-43-02-02, September 2002.

[9] V. Kuznetsov, G. Fesenko, A. Schwenk-Ferrero, A. Andrianov, and I. Kuptsov, "Innovative Nuclear Energy Systems: State-of-the Art Survey on Evaluation and Aggregation Judgment Measures Applied to Performance Comparison," *Energies*, vol. 8, no. 5, pp. 3679-3719, April 2015.

[10] K. Asakura, K. Takeuchi, T. Makino, and Y. Kato, "Feasibility Study on a Simplified MOX Pellet Fabrication Process, the Short Process, for Fast Breeder Reactor Fuel," *Nucl. Technol.*, vol. 167, no. 3, pp. 348-361, September 2009.

[11] H.-J. Matzke, *Science of advanced LMFBR fuels: solid state physics, chemistry, and technology of carbides, nitrides, and carbonitrides of uranium and plutonium*. North-Holland, 1986.

[12] "OECD/NEA Expert Group on Accident Tolerant Fuels for Light Water Reactors (EGATFL)." [Online]. Available: https://www.oecd-nea.org/science/egatfl/. [Accessed: 19 Aug. 2016].

[13] M. A. Pouchon, "14—Gelation and other innovative conversion processes for aqueous-based reprocessing and recycling of spent nuclear fuels A2—Taylor, Robin," in *Reprocessing and Recycling of Spent Nuclear Fuel*, Oxford: Woodhead Publishing, 2015, pp. 353-369.

[14] M. A. Pouchon, "PINE—Platform for Innovative Nuclear Fuels," in *CCEM: Annual Activity Report* 2012, Paul Scherrer Institut, Villigen, Switzerland: CCEM.CH, pp. 39-40.

[15] M. A. Pouchon, "MeAWat—Methods of Advanced Waste Treatment," in *CCEM: Annual Activity Report* 2014, Paul Scherrer Institut, *Villigen, Switzerland: CCEM.CH*, pp. 52-54.

[16] "FP7 EU project: Advanced fuelS for Generation IV reActors: Reprocessing and Dissolution (ASGARD) (Project reference: 295825)." [Online]. Available: http://cordis.europa.eu/project/rcn/100635 en.html. [Accessed: 18 Aug. 2016].

[17] "FP7 EU project: PELlets versus GRanulates: Irradiation, Manufacturing & Modelling (PELGRIMM) (Project reference: 295664)." [Online]. Available: http://cordis.europa.eu/project/rcn/101413 en.html. [Accessed: 18 Aug. 2016].

The invention claimed is:

1. A method of producing a green body for a nuclear fuel body, the method comprising:
   a) creating a 3D production control model for the green body;
   b) providing at least one material selected from the group consisting of a metal, a mixture of metals, a metalloid, and mixtures thereof, suitable for use in the nuclear fuel body, in form of at least one aqueous solution;
   c) providing a gelation agent in form of a gelation fluid;
   d) mixing one of the at least one aqueous solution with the gelation fluid at a first temperature to form a feed solution mixture, and thereby choosing the first temperature to suppress an internal gelation of the feed solution mixture prior to an ejection thereof;
   e) ejecting the feed solution mixture by an inkjet printing process to the green body under construction;
   f) heating the ejected feed solution mixture on the green body under construction to a second temperature, being a gelation temperature, wherein the gelation temperature is chosen to fix the ejected feed solution mixture on the green body under construction; and g) repeating steps e) and f) according to the 3D production control model until a desired form of the green body has been achieved; and h) heating the green body to a third temperature under a defined atmosphere, to achieve a formation of the green body for the nuclear fuel body and/or to partially or fully sinter the green body for the nuclear fuel body.

2. The method according to claim 1, wherein the defined atmosphere in the step of heating the green body is an oxidizing atmosphere or a reducing atmosphere.

3. The method according to claim 1, wherein the at least one aqueous solution is a metal nitrate solution.

4. The method according to claim 1, which comprises, when repeating steps e) and f), varying a composition of the feed solution mixture in terms a concentration of a metal content.

5. The method according to claim 1, which comprises feeding a pore builder fluid into the mixing step d).

6. The method according to claim 1, which comprises performing the mixing step d) immediately prior to ejecting the feed solution mixture by the inkjet printing process.

7. The method according to claim 6, which comprises performing the mixing step d) in proximity to an ink nozzle.

8. The method according to claim 1, wherein the step of heating the ejected feed solution mixture on the green body under construction comprises:

heating the green body under construction or laser and/or microwave heating the ejected feed solution mixture during and/or after depositing the ejected feed solution mixture on the green body under construction.

9. The method according to claim 1, which comprises providing a sample holder and selectively moving the sample holder horizontally and vertically, rotating the sample holder around a vertical axis, and tilting the sample holder with respect to the vertical axis.

10. The method according to claim 1, which comprises: generating in the green body for the nuclear fuel body nuclear fuel feature regions with mutually different functions selected from the group consisting of adjusted mechanical properties, barrier functions, fission behavior, and transmutation behavior.

11. The method according to claim 1, wherein step b) comprises providing at least two aqueous solutions, with the at least two aqueous solutions differing from each other in terms of composition and/or isotope concentration.

* * * * *